United States Patent [19]

Garney et al.

[11] Patent Number: 6,119,243
[45] Date of Patent: Sep. 12, 2000

[54] ARCHITECTURE FOR THE ISOCHRONOUS TRANSFER OF INFORMATION WITHIN A COMPUTER SYSTEM

[75] Inventors: John I. Garney, Aloha; Brent S. Baxter, Hillsboro, both of Oreg.

[73] Assignee: Intel Corp., Santa Clara, Calif.

[21] Appl. No.: 09/110,344

[22] Filed: Jul. 6, 1998

[51] Int. Cl.$^7$ ..................................... G06F 1/04
[52] U.S. Cl. .............. 713/600; 710/21; 710/61; 712/225
[58] Field of Search ................... 713/600, 601; 710/117, 100, 263, 123, 7, 20, 21, 33, 31, 58, 59–61; 711/100; 712/18, 220, 223, 225, 245

[56] References Cited

U.S. PATENT DOCUMENTS

| | | | |
|---|---|---|---|
| 5,208,807 | 5/1993 | Gass et al. | 370/60.1 |
| 5,533,018 | 7/1996 | DeJager et al. | 370/60.1 |
| 5,621,898 | 4/1997 | Wooten | 710/117 |
| 5,760,698 | 6/1998 | Iijima | 340/825.17 |
| 5,765,186 | 6/1998 | Searby | 711/100 |
| 5,778,218 | 7/1998 | Gulick | 713/600 |
| 5,875,343 | 2/1999 | Binford et al. | 710/263 |
| 5,996,031 | 11/1999 | Lim et al. | 710/52 |
| 6,012,117 | 1/2000 | Traw et al. | 710/123 |
| 6,041,286 | 3/2000 | White | 702/176 |

*Primary Examiner*—Albert De Cady
*Assistant Examiner*—Mai RiJue
*Attorney, Agent, or Firm*—Kenyon & Kenyon

[57] ABSTRACT

An architecture for the isochronous transfer of information within a computer system in which a first isochronous stream of information is transferred, and asynchronous information is transferred independently from the transfer of the first stream. A translation is performed between the first stream and a second isochronous stream of information, and the second stream transfers information at a rate substantially the same as the rate at which the first stream transfers information. The second stream and the asynchronous information are concurrently transferred. In another embodiment of the present invention, a first isochronous stream of information is transferred, and the first stream is divided into a plurality of first service periods. Each first service period has a first duration and contains a first amount of information. A second isochronous stream of information is transferred independently from the transfer of the first stream. The second stream is divided into a plurality of second service periods, and each second service period has a second duration and contains a second amount of information. A translation is performed between (1) the first and second streams and (2) a third isochronous stream of information. The third stream is divided into a plurality of third service periods, and each third service period has a third duration and contains a third amount of information.

28 Claims, 5 Drawing Sheets

ARCHITECTURE FOR THE ISOCHRONOUS TRANSFER OF INFORMATION WITHIN A COMPUTER SYSTEM

FIELD

The present invention relates to the transfer of information in a computer system. More particularly, the present invention relates to an architecture for the isochronous transfer of information within the computer system.

BACKGROUND

A computer system can receive, process and/or send information, including, for example, audio, video and multimedia information streams. When a transfer of information from a sending device to a receiving device is "asynchronous," the sending and receiving devices proceed independently until the sending device interrupts the receiving device to indicate the transfer is complete. Consider, for example, FIG. 1, which illustrates a known architecture for connecting an external Input/Output (IO) device 10 to a computer system 100. The IO device 10, such as a digital video camera acting as a sending device, may need to inform the computer system 100, acting as a receiving device, that a "record" mode has been selected. To do so, a single asynchronous message can be sent from the IO device 10 to the computer system 100 in response to the selection. Typically, an asynchronous transfer of information may be delayed by other, more important, activities. However, even a minor delay or gap in other types of information streams can noticeably degrade the quality of the information, such as by causing a momentary freeze in a video presentation or by introducing a stuttering effect in an audio transmission.

When a transfer of information is "synchronous," the sending and receiving devices are synchronized, such as by using the same clock signal, and the transfer of information re-occurs at identical periodic intervals. For example, the IO device 10 can send a synchronous message, indicating the camera's current mode, to the computer system 100 once every second. However, because the IO device 10 and the computer system 100, or components within the computer system 100, may be difficult to synchronize, a synchronous transfer of information may not be appropriate in some situations.

When a transfer of information is "isochronous," the sending and receiving devices are only partly synchronized, but the sending device transfers information to the receiving device at regular intervals. Such transfers can be used, for example, when information needs to arrive at the receiving device at the same rate it is sent from the sending device, but without precise synchronization of each individual data item. For example, the IO device 10 may send an isochronous stream of video information to the computer system 100 which ensures that the information flows continuously, and at a steady rate, in close timing with the ability of the computer system 100 to receive and display the video. While a synchronous transfer of information typically involves having each data transfer occur at the same time with respect to a clock signal, an isochronous transfer of information may require that up to "X" bits of data be transferred every "T" time units, although precisely when the X bits are transferred within the time T can vary. The IEEE 1394 standard (1995), entitled "High Performance Serial Bus," available from the Institute of Electrical and Electronic Engineers, is an example of an interface that supports the isochronous transfer of information.

There are several problems, however, with known methods of processing isochronous streams of information within a computer system. For example, the computer system 100 includes a processor 110 coupled to a main memory 200 through a memory controller 300. The external IO device 10 communicates with an IO unit 400 which is also coupled to the main memory 200 through the memory controller 300. The transfer of information between the memory controller 300 and the main memory 200 is asynchronous in nature. That is, even though information is transferred between the IO device 10 and the computer system 100 in an isochronous way, the information is treated in an asynchronous way within the computer system 100. For example, when an "agent," such as the processor 110, accesses the main memory 200, a delay or gap in an isochronous stream being sent from the IO device 10 to the main memory 200 can occur. If so, some of the benefits of using an isochronous stream of information, such as, for example, making sure that information flows continuously, and at a steady rate, in close timing with the ability of the computer system 100 to receive and display the image, are reduced or lost altogether.

To solve this problem, large data buffers may be provided for each isochronous device, or "agent," that communicates with the memory controller 300. Information being transferred, for example, between the IO device 10 and main memory 200 can be stored to, or retrieved from, such a buffer when the main memory 200 is not available. This can reduce the delays or gaps in an isochronous stream within the computer system 100, such as those caused by, for example, traditional cache management or memory arbitration. These large buffers can increase the cost and/or lower the performance of the computer system 100, especially if multiple IO devices, each having different bandwidth requirements, can transfer information, such as video or audio streams, with the main memory 200. Moreover, the memory controller 300 can be more difficult to build, validate and test—and unless these problems are solved the system still may not deliver information to or from memory in a reliable and timely fashion.

Even if there was a way to provide an isochronous stream of information to the main memory 200, the computer system 100 may receive several such streams. In this case, there is no easy way to merge the streams within the computer system to provide a single stream of isochronous information to the main memory 200, with or without asynchronous information.

SUMMARY

In accordance with an embodiment of the present invention, an architecture is provided for the isochronous transfer of information within a computer system. A first isochronous stream of information is transferred, and asynchronous information is transferred independently from the transfer of the first stream. A translation is performed between the first stream and a second isochronous stream of information, and the second stream transfers information at a rate substantially the same as the rate at which the first stream transfers information. The second stream and the asynchronous information are concurrently transferred.

In accordance with another embodiment of the present invention, a first isochronous stream of information is transferred, and the first stream is divided into a plurality of first service periods. Each first service period has a first duration and contains a first amount of information. A second isochronous stream of information is transferred independently from the transfer of the first stream. The second stream is divided into a plurality of second service periods, and each second service period has a second duration and contains a second amount of information. A translation is performed between (1) the first and second streams and (2) a third isochronous stream of information. The third stream is divided into a plurality of third service periods, and each third service period has a third duration and contains a third amount of information.

DETAILED DESCRIPTION

Figure 1:
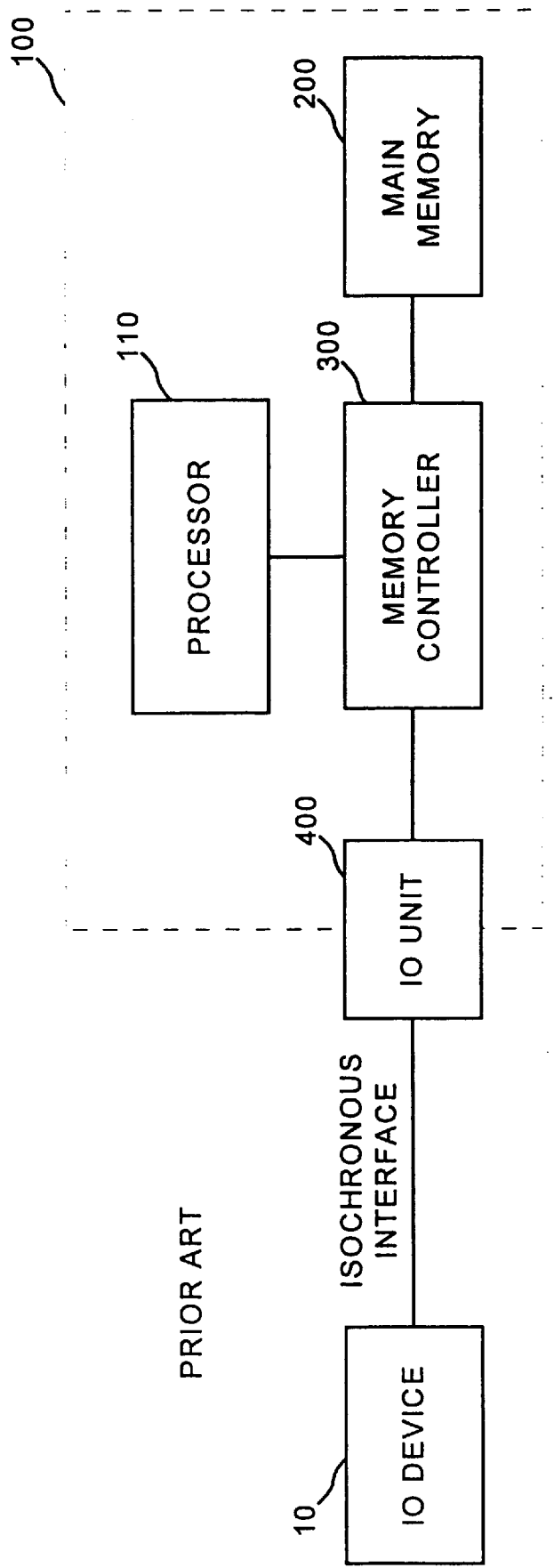
FIG. 1 illustrates a known architecture for connecting an external IO device to a computer system.
Figure 2:
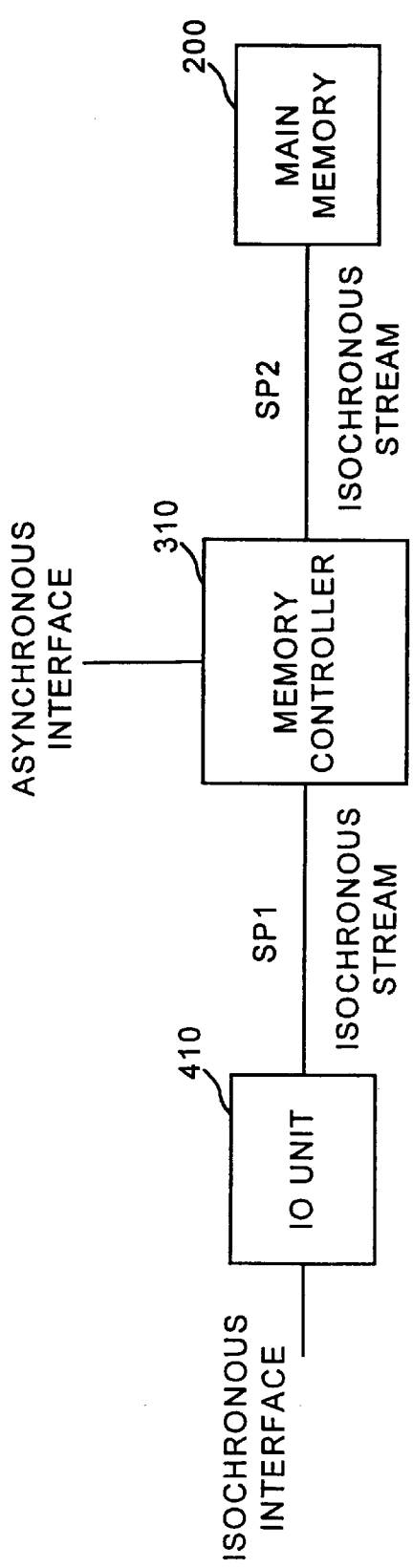
FIG. 2 is a block diagram of a computer system according to an embodiment of the present invention.

An embodiment of the present invention is directed to an architecture for the isochronous transfer of information within a computer system. Referring now in detail to the drawings wherein like parts are designated by like reference numerals throughout, there is shown in FIG. 2 a block diagram of a computer system according to an embodiment of the present invention. An isochronous stream of information may be received from, for example, an external device (not shown in FIG. 2) by an IO unit 410, and the information may ultimately be sent to a main memory 200 by a memory controller 310. As is known in the art, the main memory 200, may be, for example, a Dynamic Random Access Memory (DRAM) array. According to an embodiment of the present invention, the information transferred between the memory controller 310 and the main memory 200 may also be isochronous. As used herein, information may be "transferred" with a device by either sending the information to, or receiving the information from, the device.

Although some embodiments of the present invention are described with respect to information flowing from an external device to the main memory 200, the present invention may also be used, for example, when the information flows from the main memory 200 to an external device. Moreover, the present invention may also be used for information transfers that do not involve the main memory 200, such as, for example, from a processor to an external device.

The isochronous stream of information can be received from, for example, an external IO device through an IEEE 1394 interface. If so, the stream will comprise a series of 125 µsec packet frames, or "isochronous channel time," and each packet frame has a maximum duration dedicated to the information from the external device. The memory controller 310 may receive a first isochronous stream of information at a given rate. The first stream may comprise a plurality of first service periods (SP1), with each SP1 having a first duration and containing a first amount of information.

According to this embodiment of the present invention, the memory controller 310 may translate the first isochronous stream of information into a second isochronous stream of information to be sent, for example, to the main memory 200. The second stream may transfer information at a rate substantially the same as the rate at which the first stream transfers information. The second stream may comprise a plurality of second service periods (SP2), with each SP2 having a second duration and containing a second amount of information. As explained with respect to FIG. 3, the duration of SP1 may be different from the duration of SP2, and the amount of information in each SP1 may be different from the amount of information in each SP2.

Figure 3:
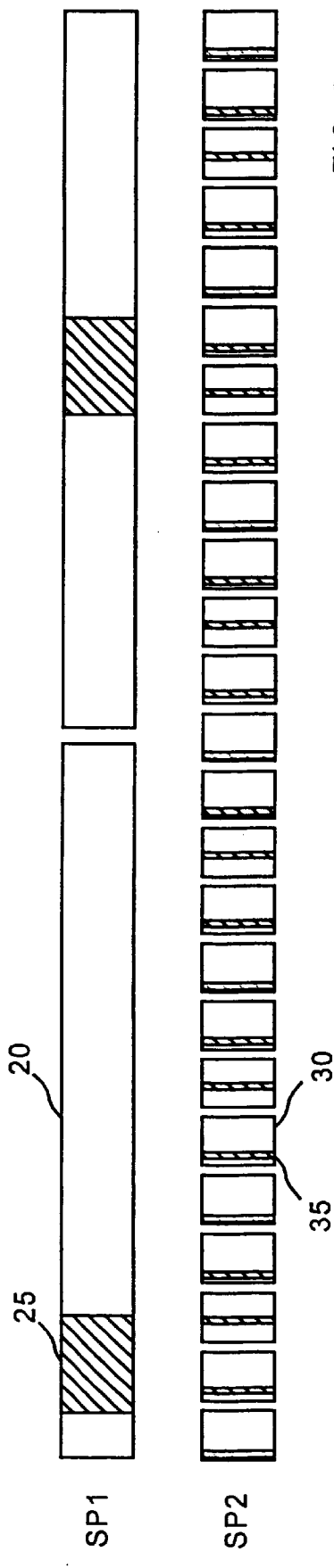
FIG. 3 illustrates the relationship between service periods according to an embodiment of the present invention.

FIG. 3 illustrates the relationship between SP1 and an SP2 according to an embodiment of the present invention. Assume, for example, that the memory controller 310 receives an isochronous stream of information at a given rate, or "bandwidth," of 25 Megabits per second (Mbps). If the information originated from an IEEE 1394 interface, the stream may comprise a plurality of first service periods (SP1), each SP1 of which may have a first duration 20 related to the size of an IEEE 1394 packet frame, or 125 µsec. Moreover, each SP1 may contain an amount of information 25 associated with an amount of information contained in an IEEE 1394 time slot, such as 3,125 bits. Note that because 3,125 bits are transferred in each 125 µsec period, a total of 25 Mbps are transferred.

The concept that an amount of information is guaranteed to be transferred in an amount of time may be thought of as an "X-T contract" to deliver the information, where X represents an amount of information to be delivered, and T represents a period of time in which that amount of information will be delivered.

The memory controller 310 may translate the received isochronous stream of information into a new isochronous stream of information to be sent to the main memory 200. The second stream may transfer information at a rate of 25 Mbps, as did the first stream. However, each SP2 associated with the second stream may have a different duration 30, such as 10 µsec, and contain a different amount of information 35, such as 250 bits. Note that when 250 bits are transferred in each 10 µsec period, a total of 25 Mbps are transferred.

The new X-T contract may be more appropriate for the main memory 200 than the X-T contract originally associated with the first isochronous stream of information. For example, if the computer system needs to frequently refresh the main memory 200, and/or let another agent, such as a processor, gain access to the main memory 200, it may be desirable to limit the amount of information to be sent as a unit to the main memory 200. Moreover, without such a translation, a buffer needs to be large enough to store 3,125 bits of information. With the translation, a buffer only needs to store 250 bits of information. Thus, by reducing the X and T in the X-T contract, smaller, and therefore less expensive, buffers may be used.

Although the example described above involved an IEEE 1349 interface, other isochronous interfaces may be used instead. For example, an Audio Codec 97 (AC97) interface or a Universal Serial Bus (USB) interface may be used to send or receive isochronous streams of information. Detailed information about the AC97 interface may be found in Audio Codec '97 Revision 2.1, dated May 22, 1998, available from Intel Corporation. Detailed specifications for the USB interface may be found in the "Universal Serial Bus Specification Revision 1.0," dated Jan. 15, 1996, Copyright © 1996, Compaq Computer Corporation, Digital Equipment Corporation, IBM PC Company, Intel Corporation, Microsoft Corporation, NEC and Northern Telecom.

Figure 4:
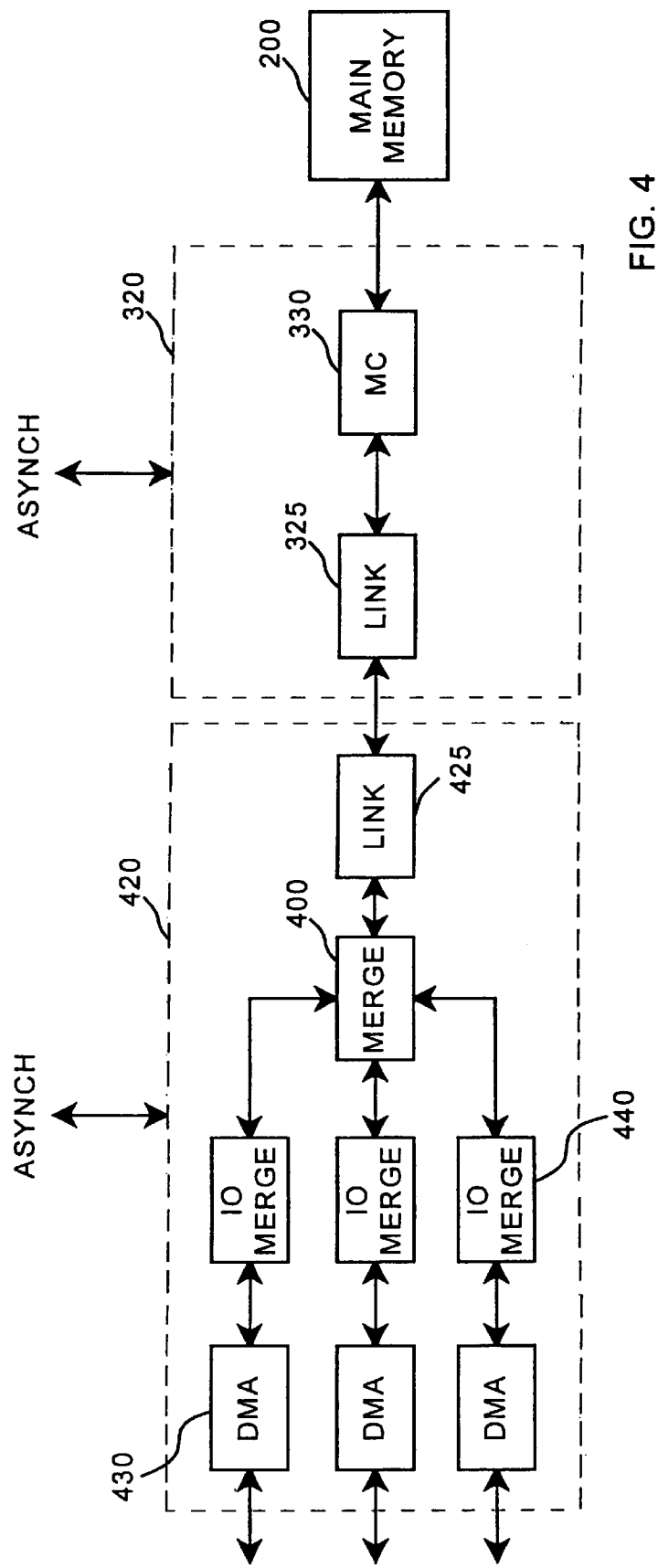
FIG. 4 is a block diagram of a computer system architecture according to another embodiment of the invention.

FIG. 4 is a block diagram of a computer system architecture according to another embodiment of the present invention. A merge bridge 420 within a computer system receives multiple independent isochronous streams of information from, for example, multiple IO devices external to the computer system (not shown in FIG. 4). Each isochronous stream passes through a Direct Memory Access (DMA) unit 430 and an IO merge unit 440 before being combined at an isochronous merge unit 400. According to an embodiment of the present invention, the isochronous merge unit 400 combines the multiple isochronous streams into a single isochronous stream.

The merge bridge 420 also contains a link 425, such as a communication port, that communicates with a link 325 in a memory bridge 320. The link 325 in the memory bridge may transfer information with a main memory 200 through a memory controller 330. According to an embodiment of the present invention, either the merge bridge 420 or the memory bridge 320 may also receive asynchronous information, and the asynchronous information may be sent to the main memory 200 concurrently with the merged isochronous streams of information.

Figure 5:
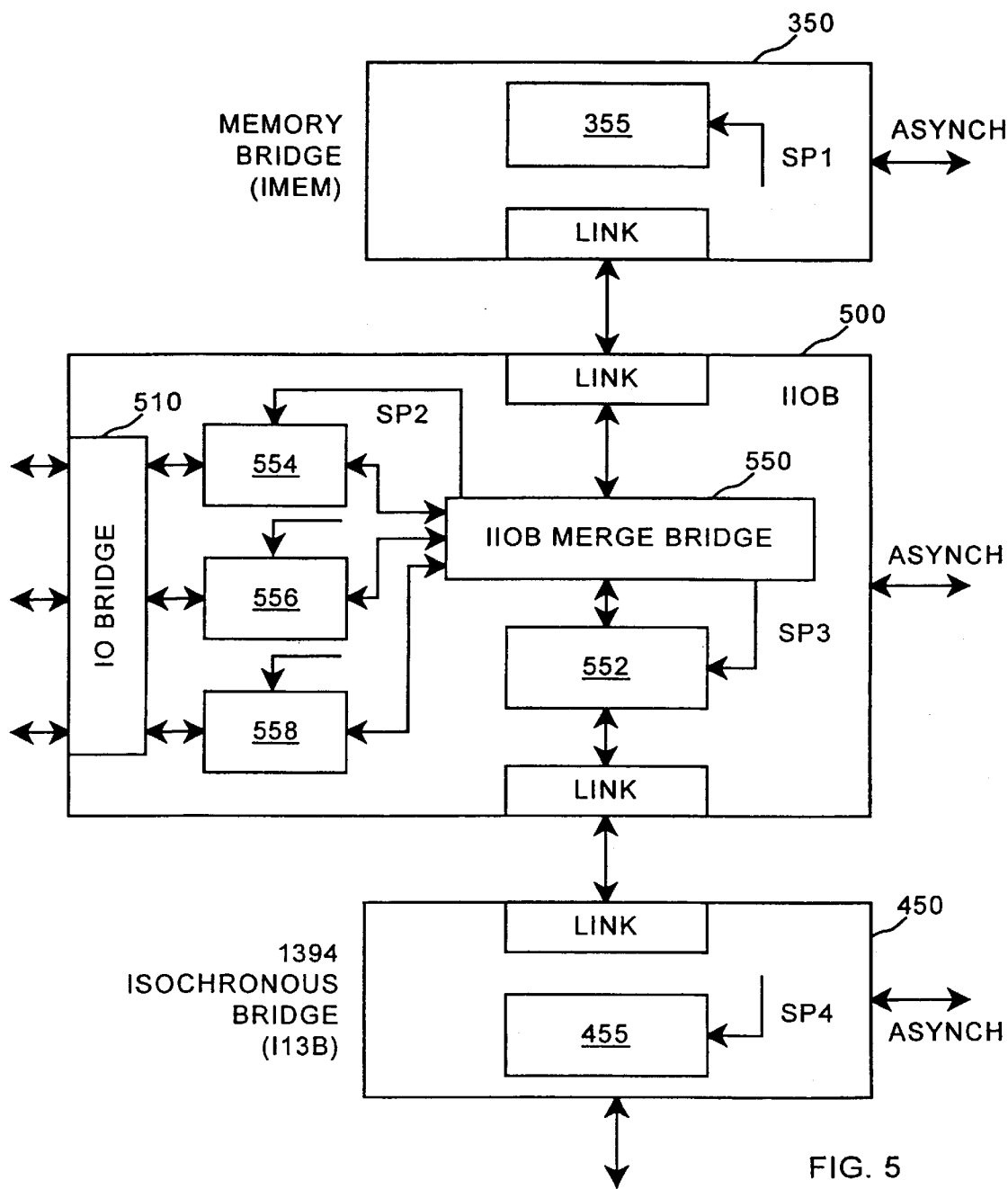
FIG. 5 is a block diagram of a computer system architecture according to another embodiment of the present invention.

FIG. 5 is a block diagram of a computer system architecture according to another embodiment of the present invention. As will be described, this embodiment of the present invention provides a fixed time period, isochronous, bi-directional memory pipeline from IO devices to memory, and the amount of data transferred per unit time can be specified at each point along the pipelined system topology. Although for ease of understanding FIG. 5 is described herein as transferring information from an external device to a main memory, it will be understood that other transfers of information are possible as well.

An Isochronous IO Bridge (IIOB) 500 receives isochronous streams of information from a number of external IO devices. For example, isochronous streams of information from one or more USB ports and/or one or more AC97 ports may pass through an IO bridge 510. As will be explained, an IIOB merge bridge 550 combines, and/or divides, bandwidth among multiple isochronous interconnects.

Each of these isochronous streams of information passes through a "rate matcher" 554, 556, 558 before reaching the IIOB merge bridge 550. As used herein, the phrase rate matcher simply refers to a device that translates a first isochronous stream of information, having a first service period, into a second isochronous stream of information, having a second service period. For example, an information buffer may serve as one type of rate matcher. In this case, a stream having, for example, an X-T contract to deliver 10 bits of information in each one second period can be translated into a stream having an X-T contract to deliver 20 bits of information in each two second period. This may be done by storing information in the buffer until the amount of information needed by the new X-T contract, or 20 bits, is reached. An information sub-divider may serve as another type of rate matcher. The information sub-divider can receive information with an X-T contract to deliver 20 bits of information in each two second period, and "break" the information into a stream with an X-T contract to deliver 10 bits of information in each one second period. Thus, rate matchers 554, 556, 558 coupled to the IO bridge 510 produce a number of isochronous data streams with equal service periods (SP2).

The IIOB merge bridge 550 may also receive, for example, an isochronous stream of information from an IEEE 1394 isochronous bridge 450 having a rate matcher 455. The rate matcher 455 in the IEEE 1394 isochronous bridge 450 and a rate matcher 552 in the IIOB 500 may be used to convert the isochronous stream of IEEE 1394 information from one service period (SP4) to another (SP3).

Finally, the IIOB merge bridge 550 may send a combined isochronous stream of information to a memory bridge 350 having a rate matcher 355. The memory bridge 350 may, for example, transfer information between a Central Processing Unit (CPU), a graphics processor and a main memory (not shown in FIG. 4). The rate matcher 355 in the memory bridge 350 may translate the isochronous stream of information into a service period (SP1) appropriate for those interfaces. In this way, the isochronous streams with different service periods, merged in the IIOB merge bridge 550, provide a single isochronous stream to the memory according to service period SP1. Moreover, the memory bridge 350 allows for traditional asynchronous access to the main memory, such as those required by the CPU and graphics processor.

According to an embodiment of the present invention, the IIOB merge bridge 550 may generate a set of service period timing signals SP2, SP3 to be used by the rate matchers 552, 554, 556, 558. Interconnections to the memory bridge 350 and IEEE 1394 isochronous bridge 450 may be provided to allow isochronous traffic to traverse the links at rates required by the specified service periods. The effect of this pipelined operation is to provide external devices the specified access to a main memory in the computer system. A further advantage is that memory read requests may provide return data a precisely specified number of service periods after the request. Moreover, the amount of data transferred per unit time, or bandwidth, can be specified at each point of the pipelined system topology. These features reduce the amount of data buffering needed to support isochronous data traffic as compared to known asynchronous approaches.

Figure 6:
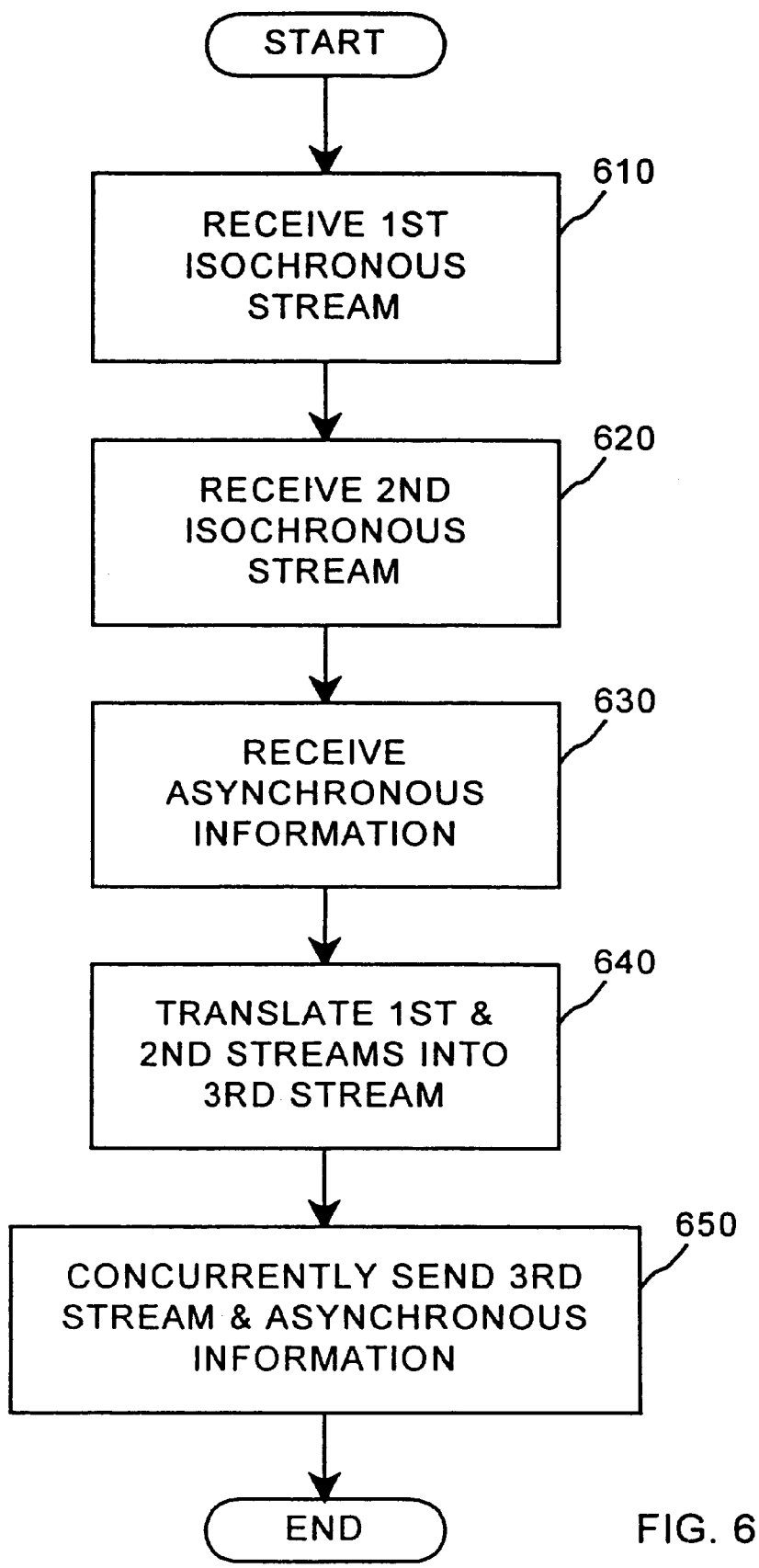
FIG. 6 is a block diagram of a method for the isochronous transfer of information within a computer system according to an embodiment of the present invention.

FIG. 6 is a block diagram of a method for the isochronous transfer of information within a computer system according to another embodiment of the present invention. After the process begins, first and second streams of isochronous information are independently received as indicated at 610 and 620. The first stream may be divided into a number of first service periods, each first service period having a first duration and containing a first amount of information. Similarly, the second stream may be divided into a number of second service periods, each second service period having a second duration and containing a second amount of information. Asynchronous information is also received, independently from the receipt of the first and second streams, as indicated at 630.

The first and second streams are translated into a third isochronous stream of information as indicated 640, and the third stream may transfer information at a rate substantially the same as the rate at which the first and second streams transfer information. The third stream may be divided into a number of third service periods, each third service period having a third duration and containing a third amount of information, although the information contained in the third stream will include the information contained in the first and second streams. According to an embodiment of the present invention, the process then concurrently sends the third stream and the asynchronous information as indicated at 650, such as by sending the information to a main memory.

According to the present invention, concurrent isochronous and asynchronous data transfers are provided between one or more IO devices and a shared main memory in a computer system. This allows a system to work with traditional asynchronous devices and with isochronous devices. It also reduces buffering in the data path between an isochronous device and the main memory, and multiple isochronous IO devices with different bandwidth requirements such that all have reliable and timely access to the main memory. The architecture permits low cost, high performance isochronous capability and still provides for more traditional asynchronous memory clients, such as access by a CPU or graphics processor.

Although various embodiments are specifically illustrated and described herein, it will be appreciated that modifications and variations of the present invention are covered by the above teachings and within the purview of the appended claims without departing from the spirit and intended scope of the invention. For example, although external isochronous IO devices were used to illustrate an architecture for the isochronous transfer of information within the computer system, it will be appreciated that internal devices may also fall within the scope of the invention. Moreover, the present invention applies to a broad range of topologies for connecting, for example, memory and IO devices, and is therefore a general architectural approach that includes a broad range of specific implementations. In addition, although particular standards and techniques were described with respect to the isochronous transfer of information, it will be understood that the present invention is not limited to a particular standard or technique. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method for the isochronous transfer of information within a computer system, comprising:

transferring a first isochronous stream of information at a given rate, said first stream having a plurality of first service periods, each first service period having a first duration and containing a first amount of information;

transferring asynchronous information independently from said transfer of the first stream;

translating between the first stream and a second isochronous stream of information, the second stream having a plurality of second service periods, each second service period having a second duration and containing a second amount of information, wherein said first duration is different from said second duration and said first amount of information is different from said second amount of information, said second stream transferring information at a rate substantially the same as the given rate at which the first stream transfers information; and concurrently transferring the second stream and the asynchronous information.

2. The method of claim 1, wherein said transfer of the first stream and the asynchronous information is performed by receiving the first stream and the asynchronous information and wherein said transfer of the second stream and the asynchronous information is performed by concurrently sending the second stream and the asynchronous information.

3. The method of claim 1, wherein said transfer of the first stream and the asynchronous information is performed by sending the first stream and the asynchronous information and wherein said transfer of the second stream and the asynchronous information is performed by concurrently receiving the second stream and the asynchronous information.

4. The method of claim 1, wherein said transfer of at least one of the first and second streams is performed by transferring the information with a main memory.

5. The method of claim 1, wherein said transfer of at least one of the first and second streams is performed by transferring the information with an IO device external to the computer system.

6. The method of claim 1, wherein at least one of said transfers of isochronous information is transferred in accordance with an IEEE 1394 standard.

7. The method of claim 1, wherein at least one of said transfers of isochronous information is transferred in accordance with a universal serial bus standard.

8. The method of claim 1, wherein at least one of said transfers of isochronous information is transferred in accordance with an audio codec standard.

9. A method for the isochronous transfer of information within a computer system, comprising:

transferring a first isochronous stream of information, the first stream comprising a plurality of first service periods, each first service period having a first duration and containing a first amount of information;

transferring a second isochronous stream of information independently from said transfer of the first stream, the second stream comprising a plurality of second service periods, each second service period having a second duration and containing a second amount of information; and translating between (1) the first and second streams and (2) a third isochronous stream of information, the third stream comprising a plurality of third service periods, each third service period having a third duration and containing a third amount of information.

10. The method of claim 9, wherein said transfers of the first and second streams are performed by receiving the first and second streams, and further comprising:

sending the third stream of information.

11. The method of claim 9, wherein said transfers of the first and second streams are performed by sending the first and second streams, and further comprising:

receiving the third stream of information.

12. The method of claim 9, wherein the first and second durations are different from the third duration and the first and second amounts of information are different from the third amount of information.

13. The method of claim 9, further comprising:

transferring asynchronous information independently from said transfer of the first and second streams; and transferring the asynchronous information concurrently with the third stream.

14. An apparatus to transfer isochronous information within a computer system, comprising:

a first communication port configured to transfer a first isochronous stream of information at a given rate, said first stream having a plurality of first service periods, each first service period having a first duration and containing a first amount of information;

a second communication port configured to transfer asynchronous information independently from said first communication port;

an isochronous translator coupled to said first and second communication ports, said isochronous translator being configured to translate between the first stream and a second isochronous stream of information, the second stream having a plurality of second service periods, each second service period having a second duration and containing a second amount of information, wherein said first duration is different from said second duration and said first amount of information is different from said second amount of information, said second stream transferring information at a rate substantially the same as the given rate at which the first stream transfers information; and a third communication port coupled to said isochronous translator, said third communications port being configured to concurrently transfer the second isochronous stream and the asynchronous information.

15. The apparatus of claim 14, wherein said first and second communication ports are configured to receive information and wherein said third communication port is configured to send information.

16. The apparatus of claim 14, wherein said first and second communication ports are configured to send information and wherein said third communication port is configured to receive information.

17. The apparatus of claim 14, wherein at least one of said communication ports are coupled to a main memory.

18. The apparatus of claim 14, wherein at least one of said communication ports are coupled to an IO device external to the computer system.

19. The apparatus of claim 14, wherein at least one of said communication ports are coupled to an IO device internal to the computer system.

20. An apparatus to transfer isochronous information within a computer system, comprising:

a first communication port configured to transfer a first isochronous stream of information, the first stream comprising a plurality of first service periods, each first service period having a first duration and containing a first amount of information;

a second communication port configured to transfer a second isochronous stream of information independently from said first communication port, the second stream comprising a plurality of second service periods, each second service period having a second duration and containing a second amount of information;

an isochronous translator coupled to said first and second communication ports, said isochronous translator being configured to translate between (1) the first and second streams and (2) a third isochronous stream of information, the third stream comprising a plurality of third service periods, each third service period having a third duration and containing a third amount of information; and a third communication port coupled to said isochronous translator and configured to transfer the third stream.

21. The apparatus of claim 20, wherein said first and second communication ports are configured to receive information and the third communication port is configured to send information.

22. The apparatus of claim 20, wherein said first and second communication ports are configured to send information and the third communication port is configured to receive information.

23. The apparatus of claim 20, wherein the first and second durations are different from the third duration and the first and second amounts of information are different from the third amount of information.

24. The apparatus of claim 20, further comprising:

a fourth communication port configured to transfer asynchronous information independently from said first and second communication ports; and wherein said isochronous translator is further coupled to said fourth communication port and the third communication port is configured to concurrently transfer the third stream and the asynchronous information.

25. An apparatus for the isochronous transfer of information within a computer system, comprising:

means for transferring a first isochronous stream of information at a given rate, said first stream having a plurality of first service periods, each first service period having a first duration and containing a first amount of information;

means for transferring asynchronous information independently from said transfer of the first stream;

means for translating between the first stream and a second isochronous stream of information, the second stream having a plurality of second service periods each second service period having a second duration and containing a second amount of information, wherein said first duration is different from said second duration and said first amount of information is different from said second amount of information, said second stream transferring information at a rate substantially the same as the given rate at which the first stream transfers information; and means for concurrently transferring the second stream and the asynchronous information.

26. An apparatus for the isochronous transfer of information within a computer system, comprising:

means for transferring a first isochronous stream of information, the first stream comprising a plurality of first service periods, each first service period having a first duration and containing a first amount of information;

means for transferring a second isochronous stream of information independently from said transfer of the first stream, the second stream comprising a plurality of second service periods, each second service period having a second duration and containing a second amount of information; and means for translating between (1) the first and second streams and (2) a third isochronous stream of information, the third stream comprising a plurality of third service periods, each third service period having a third duration and containing a third amount of information.

27. An article of manufacture comprising a computer-readable medium having stored thereon instructions adapted to be executed by a processor, the instructions which, when executed, cause the processor to transfer information within a computer system, comprising:

transferring a first isochronous stream of information at a given rate, said first stream having a plurality of first service periods, each first service period having a first duration and containing a first amount of information;

transferring asynchronous information independently from said transfer of the first stream;

translating between the first stream and a second isochronous stream of information, the second stream having a plurality of second service periods each second service period having a second duration and containing a second amount of information, wherein said first duration is different from said second duration and said first amount of information is different from said second amount of information, said second stream transferring information at a rate substantially the same as the given rate at which the first stream transfers information; and concurrently transferring the second stream and the asynchronous information.

28. An article of manufacture comprising a computer-readable medium having stored thereon instructions adapted to be executed by a processor, the instructions which, when executed, cause the processor to transfer information within a computer system, comprising:

transferring a first isochronous stream of information, the first stream comprising a plurality of first service periods, each first service period having a first duration and containing a first amount of information;

transferring a second isochronous stream of information independently from said transfer of the first stream, the second stream comprising a plurality of second service periods, each second service period having a second duration and containing a second amount of information; and translating between the first and second streams and a third isochronous stream of information, the third stream comprising a plurality of third service periods, each third service period having a third duration and containing a third amount of information.

* * * * *

UNITED STATES PATENT AND TRADEMARK OFFICE
CERTIFICATE OF CORRECTION

PATENT NO. : 6,119,243
DATED : September 12, 2000
INVENTOR(S) : John I. Garney and Brent S. Baxter Page 1 of 1

It is certified that error appears in the above-identified patent and that said Letters Patent is hereby corrected as shown below:

<u>Column 10,</u>
Line 32, "periods" should be -- periods, --

<u>Column 11,</u>
Line 9, "periods" should be -- periods, --

Signed and Sealed this

Fifth Day of February, 2002

Attest:

JAMES E. ROGAN
*Attesting Officer*   *Director of the United States Patent and Trademark Office*